June 1, 1954  S. F. CYBULSKI  2,679,694
RING GAUGE BLANK HOLDER
Filed Dec. 11, 1952

STEPHEN F. CYBULSKI  INVENTOR.

BY Fisher + Christen,
ATTYS.

Patented June 1, 1954

2,679,694

UNITED STATES PATENT OFFICE 2,679,694

RING GAUGE BLANK HOLDER

Stephen F. Cybulski, Waterbury, Conn.

Application December 11, 1952, Serial No. 325,266

5 Claims. (Cl. 33—178)

This invention relates to ring gauge holders and more especially to a ring gauge blank holder adapted to receive and removably hold a pair of ring gauge bushings in clamping engagement.

Heretofore in conventional type ring gauge holders it has been necessary that the holes for receiving the ring gauge bushing be bored to extremely close tolerances in a very heavy plate to effect a pressed fit for positioning the bushing in the holder. This excessive thickness, together with the boring operation has made such devices expensive and unnecessarily heavy and cumbersome.

It is an object of this invention, therefore, to provide an integral blank adapted to receive and hold ring gauge bushings which may be easily and cheaply constructed from a single and relatively thin piece of sheet metal stock.

It is another object of this invention to provide a ring gauge holder which is adapted to receive ring gauge bushings and hold the same in a snug clamping engagement around their periphery.

Another object of the invention is to provide a ring gauge holder adapted to hold a standard ring gauge bushing in such a manner that it may be easily replaced and will require no special type of ring gauge bushing for use therewith.

It is still another object of the invention to provide a ring gauge holder which may be stamped from relatively thin, somewhat resilient, one-piece metal stock having only split end portions and means for drawing together such split end portions to clamp the bushing snugly therein, thus making it possible to easily remove the bushings and use the ring gauge holder over and over again.

Some of the objects having been stated, others will be apparent to those skilled in the art of measuring to which this invention pertains, when the specification is read in connection with the drawing in which.

Figure 1:
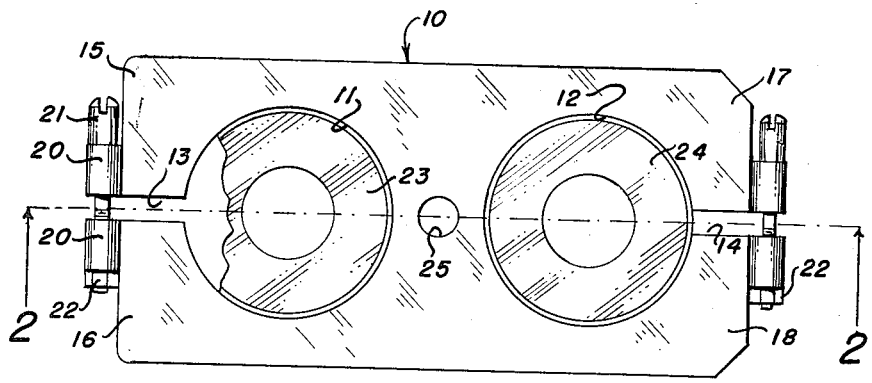
Fig. 1 is a plan view of my ring gauge holder showing a pair of ring gauge bushings clamped in operable position therein.
Figure 2:
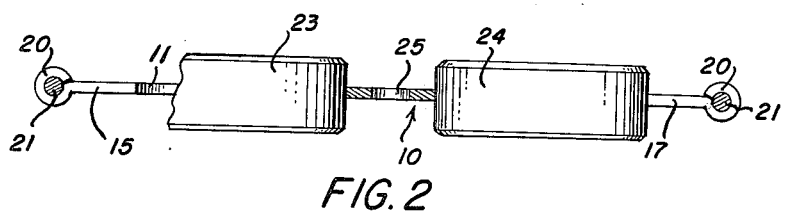
Fig. 2 is a sectional view taken substantially along the line 2—2 in Fig. 1.

It is customary when gauging the size of round metal stock and the like within close tolerances to employ a pair of bushings, one having a hole therein slightly larger than the stock, called a "go" bushing, and one having a hole slightly smaller than the stock called a "no go" bushing. If the stock fits into the "go" bushing but will not fit the hole of the "no go" bushing, it is then known that the stock is sized within certain limits, depending upon the size differential of the bushings. It is the ring gauge bushing holder or blank holder which simply operates as a handle for the ring gauge bushings that comprises the subject matter of this invention.

Referring more specifically to the drawing, a ring gauge blank holder broadly designated at 10 in the drawing may be stamped from a relatively thin piece of metal stock. The blank holder is shown in the drawing to be substantially rectangular in shape. A pair of spaced holes 11 and 12 are stamped therein together with a pair of splits 13 and 14 in the medial portion of the ends of the blank, thus forming split end portions 15, 16, 17 and 18.

Ear portions or protuberances 20 are fixedly mounted on each of the split end portions 15, 16, 17 and 18, and internally threaded so as to receive clamping screws 21. These ear portions 20 are preferably made by stamping the same integrally with the holder and then forming them into a closed loop. By tightening the screws 21, a clamping action on the split ends 15, 16, 17 and 18 is provided so as to draw the same together. A pair of ring gauge bushings, for example, a "go" and a "no go" bushing 23 and 24, respectively, are shown clampingly held in operative position in the ring gauge blank holder. Nuts 22 may be placed on the threaded end of the screws 21 so that, after the screws 21 have been tightened sufficiently to provide the necessary clamping action to hold the ring gauge bushings 23 and 24 in clamping engagement, the nuts may be tightened against the ears 21 to maintain the bushings in rigid clamping engagement.

The holes 11 and 12 may be spaced apart, as shown in the drawing a sufficient distance to accommodate a center hole 25 to hold a marking washer (not shown) for indicating the size ring gauge bushing that the holder is adapted to receive.

It is thus seen that I have provided an exceedingly simple and adaptable ring gauge blank holder to receive a pair of ring gauge bushings and to hold the same in removable clamping engagement, which affords a convenient and effective operation hitherto unknown.

By stamping the entire blank from a single thin piece of metal, not only may a considerable saving in material be effected, but also the very expensive boring operation to close tolerances, formerly necessary to provide the pressed fit for the bushings, may be avoided. The gauge holder I have provided readily receives the ring gauge bushings and after simply tightening the clamping screws, holds the bushings in rigid clamping engagement. After the gauging operation has been performed, the bushings may be easily removed and the blank does not have to be discarded, but may be re-used indefinitely.

It is apparent that the present invention has been described in a preferred embodiment and that various modifications may be made which fall within the spirit and scope thereof as set forth in the appended claims.

I claim:

1. A ring gauge holder comprising a substantially rectangular blank having a hole adapted to receive a ring gauge bushing, said blank being thin relative to said bushing, said blank having a split extending from one outer edge to said hole and forming two end portions, screw means carried by said end portions adapted to draw the two end portions together and removably clamp a ring gauge bushing therein.

2. A ring gauge holder comprising a substantially rectangular blank having a hole adapted to receive a ring gauge bushing, said blank being thin relative to said bushing, the blank having a split extending from one outer edge to said hole and forming two end portions, ear portions provided on each of the end portions adapted to receive screws for drawing the two end portions together and thereby removably clamping the ring gauge bushing therein.

3. A ring gauge holder comprising a blank having spaced holes adapted to receive ring gauge bushings therein, said blank being thin relative to said bushings, said blank having a split adjacent each hole extending from one outer edge of said blank to said hole and each forming two end portions, clamping means carried by the end portions adapted to draw the two end portions together and removably clamp a ring gauge bushing in each of said holes.

4. A ring gauge holder comprising a substantially rectangular blank having a pair of spaced holes therein adapted to receive a pair of ring gauge bushings, said blank being thin relative to said bushings, said blank having a split adjacent each hole extending from one outer edge of said blank to said hole and forming two end portions adjacent each hole; and screw means carried by the end portions adapted to draw the two end portions together and removably clamp a ring gauge bushing in each of said holes.

5. A ring gauge holder comprising a substantially rectangular blank having a pair of spaced holes therein adapted to receive a pair of bushings, said blank being thin relative to said bushings, said blank having a split adjacent each hole extending from one outer edge thereof to said hole and forming a pair of end portions adjacent each hole; and ear portions provided on each of the end portions adapted to receive screws for drawing the pair of end portions together to thereby removably clamp a ring gauge bushing in each of said holes.

References Cited in the file of this patent

UNITED STATES PATENTS

| Number | Name | Date |
|---|---|---|
| 1,913,674 | Kaufmann | June 13, 1933 |
| 2,000,783 | Muller | May 7, 1935 |
| 2,350,415 | Paulsen | June 6, 1944 |
| 2,580,412 | Darmody | Jan. 1, 1952 |